(12) United States Patent
Nishimura et al.

(10) Patent No.: US 11,945,442 B2
(45) Date of Patent: *Apr. 2, 2024

(54) AUTONOMOUS DRIVING SYSTEM AND CONTROL METHOD FOR AUTONOMOUS DRIVING SYSTEM

(71) Applicant: TOYOTA JIDOSHA KABUSHIKI KAISHA, Toyota (JP)

(72) Inventors: Naoki Nishimura, Nagoya (JP); Shingo Shibata, Sunto-gun Shizuoka-ken (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/081,007

(22) Filed: Dec. 14, 2022

(65) Prior Publication Data

US 2023/0109842 A1    Apr. 13, 2023

Related U.S. Application Data

(63) Continuation of application No. 16/580,724, filed on Sep. 24, 2019, now Pat. No. 11,613,257.

(30) Foreign Application Priority Data

Sep. 26, 2018   (JP) ................................. 2018-180609

(51) Int. Cl.
*B60W 50/14* (2020.01)
*B60W 30/18* (2012.01)
(Continued)

(52) U.S. Cl.
CPC ...... *B60W 30/18163* (2013.01); *B60W 50/14* (2013.01); *G05D 1/0061* (2013.01);
(Continued)

(58) Field of Classification Search
CPC .......... B60W 30/18163; B60W 50/14; B60W 2554/80; B60W 2050/0072; B60W 50/08;
(Continued)

(56) References Cited

U.S. PATENT DOCUMENTS 9,682,708 B2   6/2017  Maruyama
9,868,469 B2   1/2018  Sakakibara
(Continued)

FOREIGN PATENT DOCUMENTS

JP    2016071513 A    5/2016
JP    2017117367 A    6/2017

OTHER PUBLICATIONS

Notice of Allowance dated Jan. 18, 2023 to U.S. Appl. No. 16/580,724, filed Sep. 24, 20219.

*Primary Examiner* — Elaine Gort
*Assistant Examiner* — Chanmin Park
(74) *Attorney, Agent, or Firm* — Dinsmore & Shohl LLP

(57) ABSTRACT

An autonomous driving system includes an electronic control unit. The electronic control unit is configured to suggest to a driver that a host vehicle overtake a preceding vehicle during autonomous driving, recognize whether the driver accepts a suggestion for the overtaking, when the electronic control unit recognizes that the driver accepts the suggestion, cause the host vehicle to overtake the preceding vehicle, and, when the electronic control unit recognizes that the driver rejects the suggestion, not cause the host vehicle to overtake the preceding vehicle, set a first prohibition duration, and, when the electronic control unit suggests to the driver that the host vehicle overtake the preceding vehicle and recognizes that the driver rejects the suggestion, extend the first prohibition duration as compared to when the electronic control unit suggests to the driver that the host
(Continued)

vehicle overtake the preceding vehicle and recognizes that the driver accepts the suggestion.

3 Claims, 6 Drawing Sheets

(51) Int. Cl.
  *G05D 1/00* (2006.01)
  *B60W 50/00* (2006.01)
(52) U.S. Cl.
  CPC ... *G05D 1/0088* (2013.01); *B60W 2050/0072* (2013.01); *B60W 2554/80* (2020.02)
(58) Field of Classification Search
  CPC ............... G05D 1/0061; G05D 1/0088; G05D 2201/0213
  See application file for complete search history.

(56) References Cited

U.S. PATENT DOCUMENTS

| | | |
|---|---|---|
| 9,914,492 B1 | 3/2018 | Hummelshøj |
| 9,964,950 B2 | 5/2018 | Takano |
| 10,017,116 B2 | 7/2018 | Sato |
| 10,234,859 B2 | 3/2019 | Lokesh |
| 10,310,508 B2 | 6/2019 | Kunisa |
| 10,319,225 B2 | 6/2019 | Lindholm |
| 10,421,394 B2 | 9/2019 | Morimura |
| 10,431,081 B2 | 10/2019 | Kuffner, Jr. |
| 10,452,930 B2 | 10/2019 | Sato |
| 10,588,009 B2 | 3/2020 | Bansal |
| 10,597,011 B2 | 3/2020 | Ito |
| 10,600,323 B2 | 3/2020 | Morimura |
| 10,655,370 B2 | 5/2020 | Richards |
| 10,663,973 B2 | 5/2020 | Hashimoto |
| 10,743,308 B2 | 8/2020 | Sai |
| 10,759,419 B2 | 9/2020 | Kindo |
| 10,759,425 B2 | 9/2020 | Urano |
| 10,802,502 B2 | 10/2020 | Yourou |
| 10,818,167 B2 | 10/2020 | Lu |
| 10,843,688 B2 | 11/2020 | Taki |
| 10,895,875 B2 | 1/2021 | Hashimoto |
| 10,953,757 B2 | 3/2021 | Shin |
| 10,960,891 B2 | 3/2021 | Kindo |
| 10,969,456 B2 | 4/2021 | Kobayashi |
| 11,001,198 B2 | 5/2021 | Morimura |
| 11,041,957 B2 | 6/2021 | Uehara |
| 11,157,940 B2 | 10/2021 | Gaidon |
| 11,275,382 B2 | 3/2022 | Hashimoto |
| 11,285,896 B2 | 3/2022 | Friedman |
| 2016/0091896 A1 | 3/2016 | Maruyama |
| 2017/0001650 A1 | 1/2017 | Park |
| 2017/0327111 A1 | 11/2017 | Bonarens |
| 2018/0043935 A1 | 2/2018 | Hashimoto |
| 2018/0059670 A1 | 3/2018 | Nilsson |
| 2019/0390963 A1 | 12/2019 | Kumar |

AUTONOMOUS DRIVING SYSTEM AND CONTROL METHOD FOR AUTONOMOUS DRIVING SYSTEM

CROSS-REFERENCE TO RELATED APPLICATIONS

This application is a continuation application of co-pending U.S. patent application Ser. No. 16/580,724, filed Sep. 24, 2019, for "Autonomous Driving System and Control Method for Autonomous Driving System," which claims priority to Japanese Patent Application No. 2018-180609 filed on Sep. 26, 2018, which is incorporated herein by reference in its entirety including the specification, drawings and abstract.

BACKGROUND

1. Technical Field

The disclosure relates to an autonomous driving system and a control method for an autonomous driving system.

2. Description of Related Art

Japanese Unexamined Patent Application Publication No. 2017-117367 (JP 2017-117367 A) describes a driving assist system. The driving assist system learns whether a host vehicle makes a lane change based on an operating history of the host vehicle as driving characteristics, predicts whether the host vehicle makes a lane change based on the learning result, and shows driving assist information based on the information predicted by the driving assist system.

SUMMARY

In an autonomous driving system, control accompanied with a lane change of a host vehicle may be suggested to a driver during autonomous driving, and whether to permit execution of the control may be determined based on whether a driver accepts the suggestion. For example, when a suggestion of the control is not in accordance with driver's intention, the driver may feel burdensome.

Therefore, in this technical field, it is desired to suggest control that accompanies a lane change of a host vehicle during autonomous driving to reduce a burden on a driver.

An autonomous driving system according to a first aspect of the disclosure includes an electronic control unit. The electronic control unit is configured to suggest to a driver that a host vehicle overtake a preceding vehicle during autonomous driving based on map information, a position of the host vehicle on a map, and a surrounding environment of the host vehicle. The electronic control unit is configured to recognize whether the driver accepts a suggestion for the overtaking based on information input by the driver to an input unit of the host vehicle. The electronic control unit is configured to, when the electronic control unit suggests to the driver that the host vehicle overtake the preceding vehicle and recognizes that the driver accepts the suggestion, cause the host vehicle to overtake the preceding vehicle, and, when the electronic control unit suggests to the driver that the host vehicle overtake the preceding vehicle and recognizes that the driver rejects the suggestion, not cause the host vehicle to overtake the preceding vehicle. The electronic control unit is configured to set a first prohibition duration based on whether the driver accepts the suggestion, recognized by the electronic control unit, the first prohibition duration being a duration during which another suggestion for the overtaking is not allowed after the suggestion for the overtaking. The electronic control unit is configured to, when the electronic control unit suggests to the driver that the host vehicle overtake the preceding vehicle and recognizes that the driver rejects the suggestion, extend the first prohibition duration as compared to when the electronic control unit suggests to the driver that the host vehicle overtake the preceding vehicle and recognizes that the driver accepts the suggestion.

With the above configuration, when the electronic control unit suggests to the driver that the host vehicle overtake the preceding vehicle and recognizes that the driver rejects the suggestion, the first prohibition duration is extended as compared to when the electronic control unit suggests to the driver that the host vehicle overtake the preceding vehicle and recognizes that the driver accepts the suggestion. Thus, when there is a driver's intention to reject the suggestion for the overtaking, another suggestion for the overtaking becomes hard to be made. Therefore, it is possible to suggest control that accompanies a lane change of the host vehicle during autonomous driving to reduce a burden on the driver.

An autonomous driving system according to a second aspect of the disclosure includes an electronic control unit. The electronic control unit is configured to suggest to a driver that a host vehicle make a discretionary lane change during autonomous driving based on map information, a position of the host vehicle on a map, and a surrounding environment of the host vehicle. The electronic control unit is configured to recognize whether the driver accepts a suggestion for the discretionary lane change based on information input by the driver to an input unit of the host vehicle. The electronic control unit is configured to, when the electronic control unit suggests to the driver that the host vehicle make the discretionary lane change and recognizes that the driver accepts the suggestion, cause the host vehicle to make the discretionary lane change, and, when the electronic control unit suggests to the driver that the host vehicle make the discretionary lane change and recognizes that the driver rejects the suggestion, not cause the host vehicle to make the discretionary lane change. The electronic control unit is configured to set a second prohibition duration based on whether the driver accepts the suggestion, recognized by the electronic control unit, the second prohibition duration being a duration during which another suggestion for the discretionary lane change is not allowed after the suggestion for the discretionary lane change. The electronic control unit is configured to, when the electronic control unit suggests to the driver that the host vehicle make the discretionary lane change and recognizes that the driver rejects the suggestion, extend the second prohibition duration as compared to when the electronic control unit suggests to the driver that the host vehicle make the discretionary lane change and recognizes that the driver accepts the suggestion.

With the above configuration, when the electronic control unit suggests to the driver that the host vehicle make the discretionary lane change and recognizes that the driver rejects the suggestion, the second prohibition duration is extended as compared to when the electronic control unit suggests to the driver that the host vehicle make the discretionary lane change and recognizes that the driver accepts the suggestion. Thus, when there is a driver's intention to reject the suggestion for a discretionary lane change, another suggestion for a discretionary lane change becomes hard to be made. Therefore, it is possible to suggest control that accompanies a lane change of the host vehicle during autonomous driving to reduce a burden on the driver.

A third aspect of the disclosure provides a control method for an autonomous driving system. The autonomous driving system includes an electronic control unit. The control method includes suggesting, by the electronic control unit, to a driver that a host vehicle overtake a preceding vehicle during autonomous driving based on map information, a position of the host vehicle on a map, and a surrounding environment of the host vehicle, recognizing, by the electronic control unit, whether the driver accepts a suggestion for the overtaking based on information input by the driver to an input unit of the host vehicle, when the electronic control unit suggests to the driver that the host vehicle overtake the preceding vehicle and recognizes that the driver accepts the suggestion, causing, by the electronic control unit, the host vehicle to overtake the preceding vehicle, when the electronic control unit suggests to the driver that the host vehicle overtake the preceding vehicle and recognizes that the driver rejects the suggestion, not causing, by the electronic control unit, the host vehicle to overtake the preceding vehicle, setting, by the electronic control unit, a first prohibition duration based on whether the driver accepts the suggestion, recognized by the electronic control unit, the first prohibition duration being a duration during which another suggestion for the overtaking is not allowed after the suggestion for the overtaking, and, when the electronic control unit suggests to the driver that the host vehicle overtake the preceding vehicle and recognizes that the driver rejects the suggestion, extending, by the electronic control unit, the first prohibition duration as compared to when the electronic control unit suggests to the driver that the host vehicle overtake the preceding vehicle and recognizes that the driver accepts the suggestion.

As described above, according to the various aspects and embodiments of the disclosure, it is possible to suggest control that accompanies a lane change of the host vehicle during autonomous driving to reduce a burden on the driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the accompanying drawings. In the following description, like reference signs denote the identical or corresponding elements, and the description thereof will not be repeated.

First Embodiment

Figure 1:
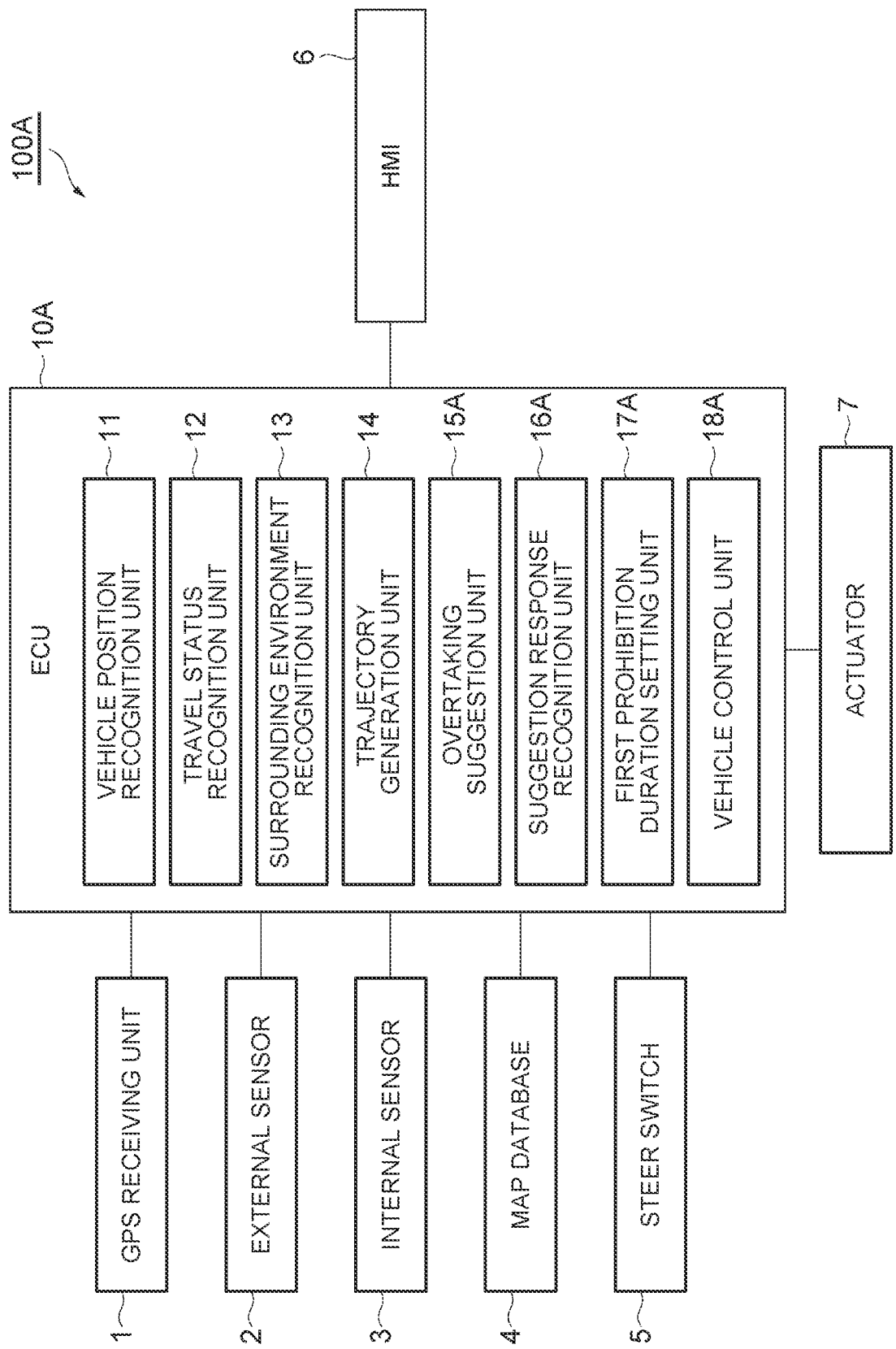
FIG. 1 is a block diagram that shows the configuration of an autonomous driving system according to a first embodiment.

FIG. 1 is a block diagram that shows the configuration of an autonomous driving system according to a first embodiment. The autonomous driving system 100A shown in FIG. 1 is mounted on a vehicle (host vehicle), such as a passenger automobile, and executes autonomous driving. That is, the autonomous driving system 100A causes the vehicle to autonomously travel. Autonomous driving is vehicle control for causing a vehicle to travel to a destination without driver's operation. The autonomous driving system 100A executes autonomous overtaking (causes the host vehicle to overtake a preceding vehicle during autonomous driving) as one of control for autonomous driving of the host vehicle.

Autonomous overtaking is vehicle control for causing a vehicle to autonomously overtake a preceding vehicle that travels immediately ahead of the host vehicle in a driving lane of the host vehicle. In autonomous overtaking, the host vehicle makes a lane change from a driving lane to an adjacent lane, and the host vehicle travels in the adjacent lane faster than or equal to the preceding vehicle, thus overtaking the preceding vehicle. The autonomous driving system 100A suggests autonomous overtaking to a driver as information on autonomous driving, and, when the driver accepts the suggestion for autonomous overtaking, causes the host vehicle to autonomously overtake a preceding vehicle.

Configuration of Autonomous Driving System 100A

As shown in FIG. 1, the autonomous driving system 100A according to the present embodiment includes an electronic control unit (ECU) 10A that generally manages vehicle control for autonomous driving. The ECU 10A includes a central processing unit (CPU), a read only memory (ROM), a random access memory (RAM), a controller area network (CAN) communication circuit, and other components. In the ECU 10A, for example, various functions are implemented when the CPU loads programs stored in the ROM onto the RAM and runs the programs loaded on the RAM. The ECU 10A may be made up of a plurality of electronic control units.

The ECU 10A is connected to a global positioning system (GPS) receiving unit 1, an external sensor 2, an internal sensor 3, a map database 4, a steer switch (input unit) 5, a human machine interface (HMI) 6, and an actuator 7.

The GPS receiving unit measures the position of the host vehicle (for example, the latitude and longitude of the host vehicle) by receiving signals from three or more GPS satellites. The GPS receiving unit 1 transmits the measured information about the position of the host vehicle to the ECU 10A.

The external sensor 2 is a detector that detects a situation around the host vehicle. The external sensor 2 includes at least one of a camera and a radar sensor.

The camera is an imaging device that captures the image of a situation outside the host vehicle. The camera is provided on the windshield inside the vehicle cabin of the host vehicle. The camera transmits a captured image on a situation outside the host vehicle to the ECU 10A. The camera may be a monocular camera or a stereo camera. The stereo camera includes two imaging units disposed to reproduce a binocular parallax. An image captured by the stereo camera contains depth-direction information.

The radar sensor is a detector that detects an obstacle around the host vehicle by using radio waves (for example, millimeter waves) or light. Examples of the radar sensor include millimeter-wave radar and light detection and ranging (LIDAR). The radar sensor transmits radio waves or light to an area around the host vehicle, and receives radio waves or light reflected by an obstacle. Thus, the radar sensor detects an obstacle. The radar sensor transmits information about the detected obstacle to the ECU 10A. Obstacles include not only fixed obstacles, such as guard rails and buildings, but also movable obstacles, such as pedestrians, bicycles, and other vehicles.

The internal sensor 3 is a detector that detects the travel status of the host vehicle. The internal sensor 3 includes a vehicle speed sensor, an acceleration sensor, and a yaw rate sensor. The vehicle speed sensor is a detector that detects the speed of the host vehicle. The vehicle speed sensor is, for example, a wheel speed sensor. The wheel speed sensor is provided on each wheel of the host vehicle, a drive shaft that rotates integrally with the wheel, or another component, and detects the rotation speed of the wheel. The vehicle speed sensor transmits information about the detected vehicle speed (information about the detected wheel speed) to the ECU 10A.

The acceleration sensor is a detector that detects the acceleration of the host vehicle. The acceleration sensor includes, for example, a longitudinal acceleration sensor and a lateral acceleration sensor. The longitudinal acceleration sensor detects the longitudinal acceleration of the host vehicle. The lateral acceleration sensor detects the lateral acceleration of the host vehicle. The acceleration sensor, for example, transmits information about the acceleration of the host vehicle to the ECU 10A. The yaw rate sensor is a detector that detects a yaw rate (rotation angular velocity) about the vertical axis at the center of gravity of the host vehicle. The yaw rate sensor may be, for example, a gyro sensor. The yaw rate sensor transmits information about the detected yaw rate of the host vehicle to the ECU 10A.

The map database 4 is a database that stores map information. The map database 4 is, for example, stored in a hard disk drive (HDD) mounted on the host vehicle. The map information contains information about the positions of roads, road shape information (such as the type of a curve or straight section, and the curvature of a curve), information about the positions of intersections and branch points, information about the positions of buildings, and other information. The map database 4 may be stored in a computer of a facility, such as a management center that is communicable with the host vehicle.

The steer switch 5 is, for example, a switch provided at a steering wheel of the host vehicle. The steer switch 5 receives driver's input as to whether to accept autonomous overtaking. Input for acceptance is driver's input through which the driver conveys the intention to accept a suggestion for autonomous overtaking to the autonomous driving system 100A. Input to reject autonomous overtaking is driver's input through which the driver conveys the intention to reject a suggestion for autonomous overtaking to the autonomous driving system 100A. The steer switch 5 transmits information about the detected input to accept or reject autonomous overtaking to the ECU 10A.

The steer switch 5 receives driver's voluntary input for autonomous overtaking. Voluntary input is driver's voluntary input (driver trigger) through which the driver conveys the intention to make a request of the host vehicle to autonomously overtake a preceding vehicle to the autonomous driving system 100A when an overtaking suggestion unit 15A (described later) has not suggested autonomous overtaking. The steer switch 5 transmits information about the detected voluntary input to the ECU 10A.

The HMI 6 is an interface for inputting or outputting information between the autonomous driving system 100A and an occupant (including the driver). The HMI 6 includes a display, a speaker, and the like. The HMI 6 outputs an image through the display or outputs voice from the speaker in response to a control signal from the ECU 10A.

The display is a display device provided in the host vehicle such that the driver can see the display. The display is provided on, for example, a dashboard of the host vehicle. The display has a display screen for showing an image to the driver. The display shows an image on the display screen based on a control signal from the ECU 10A. Alternatively, the display may be a head up display (HUD) that projects an image onto the windshield or projection screen of the host vehicle.

The speaker is a voice output device that is mounted on the host vehicle and that outputs voice to the driver. The speaker is, for example, provided on the inner side of a door of a driver seat. The speaker outputs voice based on a control signal from the ECU 10A.

The actuator 7 is a device that is used to control the host vehicle. The actuator 7 at least includes a drive actuator, a brake actuator, and a steering actuator. The drive actuator controls the amount of air supplied to an engine (throttle opening degree) in response to a control signal from the ECU 10A, and controls the driving force of the host vehicle. When the host vehicle is a hybrid vehicle, a control signal from the ECU 10A is input to a motor that serves as a power source and the driving force is controlled, in addition to control over the amount of air supplied to the engine. When the host vehicle is an electric vehicle, a control signal from the ECU 10A is input to a motor that serves as a power source, and the driving force is controlled. The motor that serves as a power source in these cases is a component of the actuator 7.

The brake actuator controls a brake system in response to a control signal from the ECU 10A, and controls braking force that is applied to the wheels of the host vehicle. The brake system may be, for example, a hydraulic brake system. The steering actuator controls an assist motor in response to a control signal from the ECU 10A. Within an electric power steering system, the assist motor controls steering torque. Thus, the steering actuator controls the steering torque of the host vehicle.

Next, the functional configuration of the ECU 10A will be described. In the following description, to explain control that the ECU 10A executes, the functions of the ECU 10A are referred to as a vehicle position recognition unit 11, a travel status recognition unit 12, a surrounding environment recognition unit 13, a trajectory generation unit 14, the overtaking suggestion unit 15A, a suggestion response recognition unit 16A, a first prohibition duration setting unit 17A, and a vehicle control unit (overtaking execution unit) 18A for the sake of convenience. Part of the functions of the ECU 10A may be executed on a server that is communicable with the host vehicle.

The vehicle position recognition unit 11 recognizes the position of the host vehicle on a map based on the information about the position acquired by the GPS receiving unit 1 and the map information of the map database 4. The vehicle position recognition unit 11 accurately recognizes the position of the host vehicle with the simultaneous localization and mapping (SLAM) technology by using information detected by the external sensor 2 and information about the positions of targets contained in the map information of the map database 4. The vehicle position recognition unit 11 may recognize the position of the host vehicle on the map with other known techniques.

The travel status recognition unit 12 recognizes the travel status of the host vehicle based on information detected by the internal sensor 3. The travel status contains the vehicle speed of the host vehicle, the acceleration of the host vehicle, and the yaw rate of the host vehicle. Specifically, the travel status recognition unit 12 recognizes the vehicle speed of the host vehicle based on information about the vehicle speed detected by the vehicle speed sensor. The travel status recognition unit 12 recognizes the direction of the host vehicle based on information about the yaw rate detected by the yaw rate sensor.

The surrounding environment recognition unit 13 recognizes a surrounding environment of the host vehicle based on information detected by the external sensor 2 (information about an obstacle detected by the radar sensor or information about an image captured by the camera). The surrounding environment contains whether there is any adjacent lane adjacent to a driving lane of the host vehicle and a situation of an obstacle (including another vehicle) around the host vehicle. When there is an adjacent lane, the surrounding environment contains a situation of another vehicle that travels in the adjacent lane (such as whether there is another vehicle, the position of another vehicle, and the relative vehicle speed of another vehicle to the host vehicle). The surrounding environment recognition unit 13 recognizes the presence of an adjacent lane through recognition of a white line of the adjacent lane based on, for example, information detected by the external sensor 2. Alternatively, when the position of the host vehicle on the map has been recognized, the surrounding environment recognition unit 13 may recognize the presence of an adjacent lane by using the map information.

The trajectory generation unit 14 generates a trajectory that is used in autonomous driving of the host vehicle. The trajectory generation unit 14 generates a trajectory for autonomous driving with various techniques based on a destination set in advance, the map information of the map database 4, the position of the host vehicle on the map, recognized by the vehicle position recognition unit 11, the travel status (vehicle speed, yaw rate, and the like) of the host vehicle, recognized by the travel status recognition unit 12, and a surrounding environment recognized by the surrounding environment recognition unit 13. The destination may be set by the occupant of the host vehicle or may be a destination autonomously suggested by the autonomous driving system 100A or a known navigation system. The trajectory generation unit 14 generates a trajectory that is used in autonomous overtaking when the overtaking suggestion unit 15A (described later) suggests autonomous overtaking or when the suggestion response recognition unit 16A (described later) recognizes driver's voluntary input for autonomous overtaking.

The overtaking suggestion unit 15A suggests autonomous overtaking to the driver based on the map information, the position of the host vehicle on the map, and the surrounding environment of the host vehicle.

Specifically, the overtaking suggestion unit 15A recognizes a relative situation of a preceding vehicle to the host vehicle based on information detected by the external sensor 2 (information about an obstacle detected by the radar sensor or information about an image captured by the camera). The relative situation of a preceding vehicle to the host vehicle contains the relative distance (inter-vehicle distance) between the host vehicle and the preceding vehicle and the relative vehicle speed of the preceding vehicle to the host vehicle.

For example, when there is an adjacent lane adjacent to a driving lane, the overtaking suggestion unit 15A recognizes that the host vehicle can make a lane change from the driving lane to the adjacent lane. The overtaking suggestion unit 15A may further consult traffic regulation information, and recognize that the host vehicle can make a lane change from the driving lane to the adjacent lane only when the host vehicle is traveling in a section where a lane change is permitted by traffic regulations. The traffic regulation information may be acquired from the map information or may be acquired by recognizing a traffic sign on a roadside based on information about an image captured by the camera.

The overtaking suggestion unit 15A may recognize that the host vehicle can make a lane change from the driving lane to the adjacent lane when there is no other vehicle that interferes with the lane change in the adjacent lane. Another vehicle that interferes with a lane change may be, for example, another vehicle that travels in the adjacent lane and whose time to collision with the host vehicle in a direction in which the driving lane extends (in a direction in which the adjacent lane extends) is shorter than or equal to a threshold set in advance. Another vehicle that interferes with a lane change may be recognized with other known techniques in the technical field of lane change control.

The overtaking suggestion unit 15A suggests autonomous overtaking to the driver based on the relative situation of a preceding vehicle to the host vehicle and the surrounding environment of the host vehicle. The overtaking suggestion unit 15A suggests autonomous overtaking to the driver, for example, when the time to collision between the host vehicle and a preceding vehicle becomes shorter than an autonomous overtaking suggestion threshold set in advance.

The overtaking suggestion unit 15A does not suggest autonomous overtaking to the driver until a first prohibition duration elapses from the last suggestion for autonomous overtaking. The first prohibition duration is set by the first prohibition duration setting unit 17A (described later). The first prohibition duration is a duration (interval) during which the overtaking suggestion unit 15A is not allowed to make another suggestion for autonomous overtaking after a suggestion for autonomous overtaking.

The overtaking suggestion unit 15A determines whether the current suggestion for autonomous overtaking is the first suggestion. The first suggestion means a suggestion for autonomous overtaking, which is made for the first time after predetermined initialization timing (for example, on power-up of the ECU 10A). When the overtaking suggestion unit 15A determines that the current suggestion for autonomous overtaking is the first suggestion, the overtaking suggestion unit 15A suggests autonomous overtaking to the driver irrespective of the first prohibition duration.

When the overtaking suggestion unit 15A determines that the current suggestion for autonomous overtaking is not the first suggestion, the overtaking suggestion unit 15A determines whether the first prohibition duration has elapsed from the last suggestion for autonomous overtaking. The overtaking suggestion unit 15A, for example, stores a time at which the overtaking suggestion unit 15A has made a last suggestion for autonomous overtaking as a last suggestion time, and determines whether the first prohibition duration has elapsed from the last suggestion for autonomous overtaking based on whether elapsed time from the stored last suggestion time is longer than or equal to the first prohibition duration at the time of a subsequent suggestion for autonomous overtaking. When the overtaking suggestion unit 15A determines that the elapsed time from the stored last suggestion time is longer than or equal to the first prohibition duration, the overtaking suggestion unit 15A may suggest autonomous overtaking to the driver. When the overtaking suggestion unit 15A determines that the elapsed time from the stored last suggestion time is not longer than or equal to the first prohibition duration, the overtaking suggestion unit 15A does not suggest autonomous overtaking to the driver.

The overtaking suggestion unit 15A suggests autonomous overtaking to the driver by transmitting a control signal to the HMI 6. The overtaking suggestion unit 15A, for example, suggests to the driver via voice output from the speaker that the host vehicle overtake a preceding vehicle by making a lane change. Voice output also includes buzzer only. The overtaking suggestion unit 15A may show an image for suggesting autonomous overtaking on the display in addition to the speaker. The overtaking suggestion unit 15A may suggest autonomous overtaking by only showing an image on the display. The overtaking suggestion unit 15A may further call driver's attention by vibrating the steering wheel or vibrating the driver seat.

When the overtaking suggestion unit 15A has suggested autonomous overtaking, the suggestion response recognition unit 16A recognizes whether the driver accepts the suggestion for autonomous overtaking, made by the overtaking suggestion unit 15A, based on information input by the driver to the steer switch 5 of the host vehicle.

When the overtaking suggestion unit 15A has suggested autonomous overtaking, the suggestion response recognition unit 16A determines whether the driver has made input for acceptance or input for rejection based on information that the driver inputs to the steer switch 5. For example, when the overtaking suggestion unit 15A has suggested autonomous overtaking and the suggestion response recognition unit 16A determines that the driver has made input for acceptance to the steer switch 5, the suggestion response recognition unit 16A recognizes driver's acceptance. For example, when the overtaking suggestion unit 15A has suggested autonomous overtaking and the suggestion response recognition unit 16A determines that the driver has made input to reject the suggestion to the steer switch 5, the suggestion response recognition unit 16A recognizes that the driver rejects the suggestion.

When the duration of the state where the driver has not made input for acceptance or input for rejection is longer than or equal to a set duration from when the overtaking suggestion unit 15A suggests autonomous overtaking, the suggestion response recognition unit 16A may recognize that the driver rejects the suggestion.

When the overtaking suggestion unit 15A has not suggested autonomous overtaking, the suggestion response recognition unit 16A determines whether the driver has made voluntary input based on information input by the driver to the steer switch 5 of the host vehicle. For example, when the overtaking suggestion unit 15A has not suggested autonomous overtaking and the suggestion response recognition unit 16A determines that the driver has made voluntary input for autonomous overtaking to the steer switch 5, the suggestion response recognition unit 16A recognizes that the driver has made voluntary input.

The first prohibition duration setting unit 17A sets the first prohibition duration based on information that the suggestion response recognition unit 16A recognizes. The first prohibition duration setting unit 17A sets a predetermined duration set in advance as an initial value of the first prohibition duration, for example, at the predetermined initialization timing (for example, on power-up of the ECU 10A).

When the overtaking suggestion unit 15A has suggested autonomous overtaking to the driver and the suggestion response recognition unit 16A recognizes that the driver rejects the suggestion, the first prohibition duration setting unit 17A extends the first prohibition duration as compared to when the overtaking suggestion unit 15A has suggested autonomous overtaking to the driver and the suggestion response recognition unit 16A recognizes that the driver accepts the suggestion. More specifically, when the overtaking suggestion unit 15A suggests autonomous overtaking to the driver and the suggestion response recognition unit 16A recognizes that the driver rejects the suggestion, the first prohibition duration setting unit 17A extends the first prohibition duration (sets the first prohibition duration to a longer duration). On the other hand, when the overtaking suggestion unit 15A suggests autonomous overtaking to the driver and the suggestion response recognition unit 16A recognizes that the driver accepts the suggestion, the first prohibition duration setting unit 17A does not extend the first prohibition duration. Not extending the first prohibition duration includes keeping the first prohibition duration and shortening the first prohibition duration (setting the first prohibition duration to a shorter duration).

Specifically, when the overtaking suggestion unit 15A suggests autonomous overtaking to the driver and the suggestion response recognition unit 16A recognizes that the driver rejects the suggestion, the first prohibition duration setting unit 17A extends the first prohibition duration by, for example, adding a predetermined adding duration to the first prohibition duration before the suggestion response recognition unit 16A recognizes that the driver rejects the suggestion. The predetermined adding duration means the amount of increase in the first prohibition duration for reducing the frequency of suggestion for autonomous overtaking based on driver's intention to reject the suggestion. The predetermined adding duration may be a fixed value or may be a variable value.

When the overtaking suggestion unit 15A suggests autonomous overtaking to the driver and the suggestion response recognition unit 16A recognizes that the driver accepts the suggestion, the first prohibition duration setting unit 17A may, for example, keep the first prohibition time as that before the suggestion response recognition unit 16A recognizes that the driver accepts the suggestion. The first prohibition duration when kept in this way is shorter than the first prohibition duration when the suggestion response recognition unit 16A recognizes that the driver rejects the suggestion. Alternatively, when the overtaking suggestion unit 15A suggests autonomous overtaking to the driver and the suggestion response recognition unit 16A recognizes that the driver accepts the suggestion, the first prohibition duration setting unit 17A may shorten the first prohibition duration by, for example, subtracting a predetermined subtracting duration from the first prohibition duration before the suggestion response recognition unit 16A recognizes that the driver accepts the suggestion. The predetermined subtracting duration means the amount of reduction in the first prohibition duration for increasing the frequency of suggestion for autonomous overtaking based on driver's intention to accept the suggestion. The predetermined subtracting duration may be a fixed value or may be a variable value. When the first prohibition duration setting unit 17A shortens the first prohibition duration, the first prohibition duration setting unit 17A may set the first prohibition duration such that the first prohibition duration is not shorter than the initial value.

When the overtaking suggestion unit 15A suggests autonomous overtaking to the driver and the suggestion response recognition unit 16A recognizes multiple consecutive times that the driver rejects the suggestion, the first prohibition duration setting unit 17A may extend the first prohibition duration according to the number of times the suggestion response recognition unit 16A recognizes that the driver rejects the suggestion based on driver's intention to consecutively reject the suggestion.

The first prohibition duration setting unit 17A may return the first prohibition duration to the initial value when the suggestion response recognition unit 16A recognizes voluntary input after the suggestion response recognition unit 16A recognizes that the driver rejects the suggestion. Alternatively, the first prohibition duration setting unit 17A may set the first prohibition duration such that the first prohibition duration becomes the first prohibition duration just before the suggestion response recognition unit 16A recognizes that the driver rejects the suggestion.

The vehicle control unit 18A executes autonomous driving of the host vehicle based on the position of the host vehicle on the map, recognized by the vehicle position recognition unit 11, the travel status of the host vehicle, recognized by the travel status recognition unit 12, the surrounding environment recognized by the surrounding environment recognition unit 13, and the trajectory generated by the trajectory generation unit 14. The vehicle control unit 18A executes autonomous driving by causing the host vehicle to travel along the trajectory. The vehicle control unit 18A executes autonomous driving with a known technique.

The vehicle control unit 18A causes the host vehicle to autonomously overtake a preceding vehicle based on information that the suggestion response recognition unit 16A recognizes. When the suggestion response recognition unit 16A recognizes that the driver accepts a suggestion for autonomous overtaking suggested to the driver by the overtaking suggestion unit 15A, the vehicle control unit 18A causes the host vehicle to autonomously overtake the preceding vehicle. The vehicle control unit 18A causes the host vehicle to autonomously overtake the preceding vehicle by transmitting a control signal to the actuator 7. The vehicle control unit 18A is able to execute autonomous overtaking through known vehicle control. Autonomous overtaking may be executed through a combination of lane change control and vehicle speed control.

When the suggestion response recognition unit 16A recognizes that the driver has made voluntary input before elapsed time from the time at which the overtaking suggestion unit 15A has suggested autonomous overtaking last time becomes longer than or equal to the first prohibition duration, the vehicle control unit 18A may cause the host vehicle to autonomously overtake a preceding vehicle. For example, when the overtaking suggestion unit 15A determines that elapsed time from the last suggestion time stored in the overtaking suggestion unit 15A is not longer than or equal to the first prohibition duration and the suggestion response recognition unit 16A recognizes that the driver has made voluntary input, the vehicle control unit 18A causes the host vehicle to autonomously overtake a preceding vehicle.

When the suggestion response recognition unit 16A recognizes that the driver rejects autonomous overtaking suggested to the driver by the overtaking suggestion unit 15A, the vehicle control unit 18A does not cause the host vehicle to overtake a preceding vehicle. When the duration of the state where the driver has not made input to accept or input to reject the suggestion for autonomous overtaking suggested to the driver by the overtaking suggestion unit 15A is longer than a set duration from when the overtaking suggestion unit 15A suggests autonomous overtaking, the vehicle control unit 18A does not cause the host vehicle to autonomously overtake a preceding vehicle. When the overtaking suggestion unit 15A determines that elapsed time from the stored last suggestion time is not longer than or equal to the first prohibition duration and the suggestion response recognition unit 16A does not recognize that the driver has made voluntary input, the vehicle control unit 18A does not cause the host vehicle to autonomously overtake a preceding vehicle.

Example of Computation Process by ECU 10A

Figure 2:
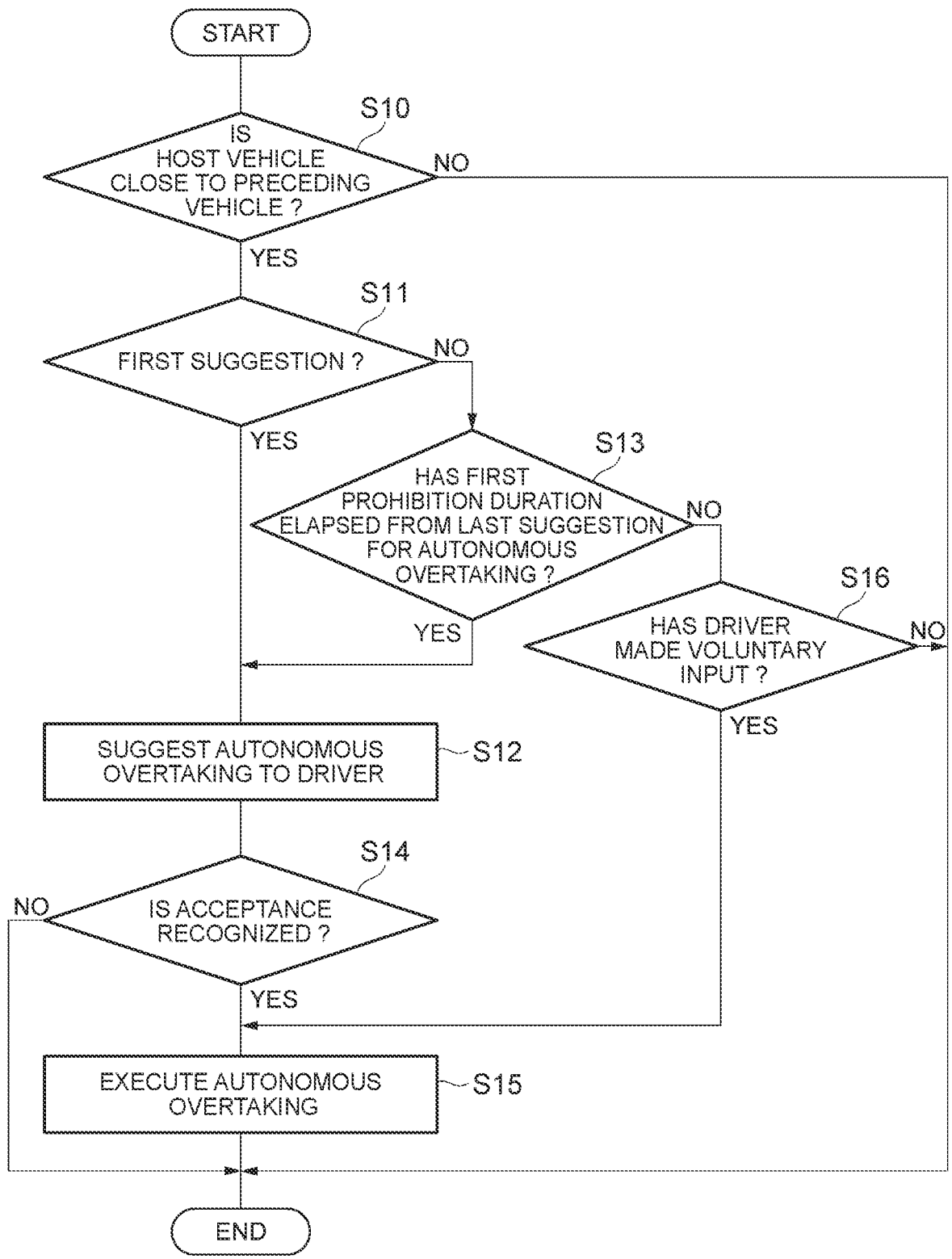
FIG. 2 is a flowchart that illustrates an autonomous overtaking process.

Next, an example of a computation process by the ECU 10A will be described. FIG. 2 is a flowchart that illustrates an autonomous overtaking process. The process shown in FIG. 2 is executed, for example, in a situation in which the host vehicle can make a lane change from a driving lane to an adjacent lane during autonomous driving of the host vehicle.

As shown in FIG. 2, the overtaking suggestion unit 15A of the ECU 10A determines in S10 whether the host vehicle is close to a preceding vehicle. The overtaking suggestion unit 15A determines whether the host vehicle is close to the preceding vehicle by, for example, determining whether the time to collision between the host vehicle and the preceding vehicle is shorter than the autonomous overtaking suggestion threshold set in advance based on the information detected by the external sensor 2.

When the overtaking suggestion unit 15A determines in S10 that the host vehicle is close to the preceding vehicle, the overtaking suggestion unit 15A of the ECU 10A determines in S11 whether the current suggestion for autonomous overtaking is the first suggestion.

When the overtaking suggestion unit 15A determines that the current suggestion for autonomous overtaking is the first suggestion (YES in S11), the overtaking suggestion unit 15A of the ECU 10A suggests autonomous overtaking to the driver in S12. The overtaking suggestion unit 15A suggests autonomous overtaking to the driver by, for example, transmitting a control signal to the HMI 6.

When the overtaking suggestion unit 15A determines that the current suggestion for autonomous overtaking is not the first suggestion (NO in S11), the overtaking suggestion unit 15A of the ECU 10A determines in S13 whether the first prohibition duration has elapsed from the last suggestion for autonomous overtaking. The overtaking suggestion unit 15A determines whether the first prohibition duration has elapsed from the last suggestion for autonomous overtaking based on, for example, whether elapsed time from the last suggestion time stored at the time of the last suggestion for autonomous overtaking is longer than or equal to the first prohibition duration.

When the overtaking suggestion unit 15A determines that the first prohibition duration has elapsed from the last suggestion for autonomous overtaking (YES in S13), the ECU 10A proceeds to S12, and the overtaking suggestion unit 15A of the ECU 10A suggests autonomous overtaking to the driver.

The suggestion response recognition unit 16A of the ECU 10A determines in S14 whether the suggestion response recognition unit 16A recognizes driver's acceptance. The suggestion response recognition unit 16A determines whether to recognize that the driver accepts the suggestion for autonomous overtaking based on, for example, information input through the steer switch 5. When the suggestion response recognition unit 16A determines that the suggestion response recognition unit 16A recognizes driver's acceptance (YES in S14), the vehicle control unit 18A of the ECU 10A executes autonomous overtaking in S15. The vehicle control unit 18A causes the host vehicle to autonomously overtake the preceding vehicle by, for example, transmitting a control signal to the actuator 7.

When the suggestion response recognition unit 16A determines that the suggestion response recognition unit 16A does not recognize driver's acceptance (NO in S14), the vehicle control unit 18A of the ECU 10A does not execute autonomous overtaking. When the suggestion response recognition unit 16A recognizes that the driver rejects the suggestion for autonomous overtaking suggested to the driver by the overtaking suggestion unit 15A, the vehicle control unit 18A does not cause the host vehicle to autonomously overtake the preceding vehicle. Alternatively, when the duration of the state where the driver has not made input to accept or reject the suggestion for autonomous overtaking suggested to the driver by the overtaking suggestion unit 15A is longer than or equal to a set duration from when the overtaking suggestion unit 15A suggests autonomous overtaking, the vehicle control unit 18A does not cause the host vehicle to autonomously overtake a preceding vehicle. The process of FIG. 2 is ended.

On the other hand, when the overtaking suggestion unit 15A determines that the first prohibition duration has not elapsed from the last suggestion for autonomous overtaking (NO in S13), the overtaking suggestion unit 15A does not suggest autonomous overtaking to the driver, and the vehicle control unit 18A determines in S16 whether the suggestion response recognition unit 16A recognizes that the driver has made voluntary input.

When the vehicle control unit 18A determines that the suggestion response recognition unit 16A recognizes that the driver has made voluntary input (YES in S16), the ECU 10A proceeds to S15, and the vehicle control unit 18A executes autonomous overtaking. When the vehicle control unit 18A determines that the suggestion response recognition unit 16A does not recognize that the driver has made voluntary input (NO in S16), the ECU 10A does not execute autonomous overtaking and ends the process of FIG. 2.

Figure 3:
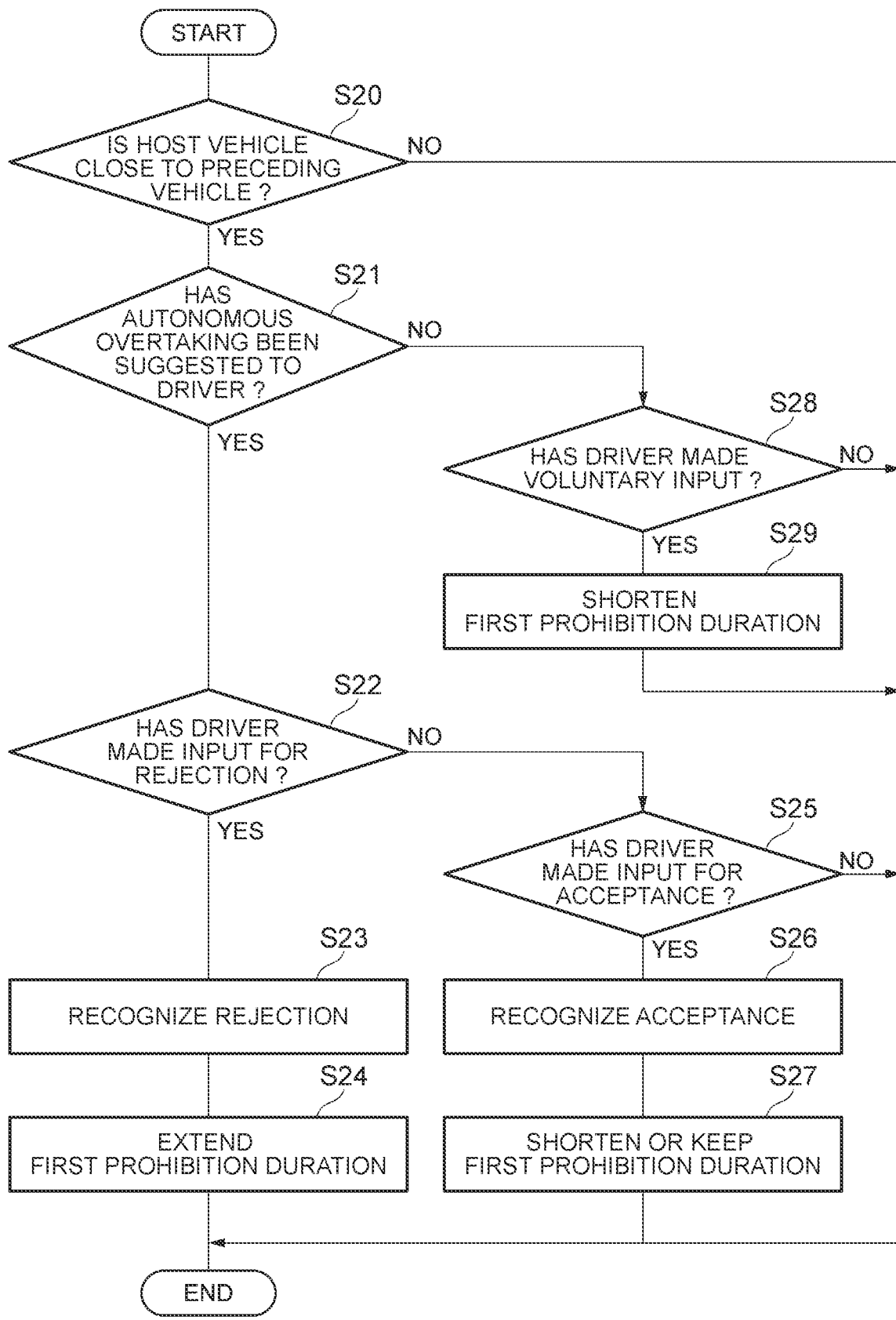
FIG. 3 is a flowchart that illustrates a first prohibition duration setting process.

Subsequently, FIG. 3 is a flowchart that illustrates a first prohibition duration setting process. The process shown in FIG. 3 is, for example, executed in a situation in which the host vehicle can make a lane change from a driving lane to an adjacent lane during autonomous driving of the host vehicle.

As shown in FIG. 3, the overtaking suggestion unit 15A of the ECU 10A determines in S20 whether the host vehicle is close to the preceding vehicle. The overtaking suggestion unit 15A, for example, determines whether the host vehicle is close to the preceding vehicle as in the case of S10. When the overtaking suggestion unit 15A determines that the host vehicle is not close to the preceding vehicle (NO in S20), the ECU 10A ends the process of FIG. 3.

When the overtaking suggestion unit 15A determines that the host vehicle is close to the preceding vehicle (YES in S20), the first prohibition duration setting unit 17A of the ECU 10A determines in S21 whether the overtaking suggestion unit 15A has suggested autonomous overtaking to the driver. For example, when the overtaking suggestion unit 15A has transmitted a control signal to the HMI 6 in S12, the first prohibition duration setting unit 17A may determine that the overtaking suggestion unit 15A has suggested autonomous overtaking to the driver.

When the first prohibition duration setting unit 17A determines that the overtaking suggestion unit 15A has suggested autonomous overtaking to the driver (YES in S21), the suggestion response recognition unit 16A of the ECU 10A determines in S22 whether the driver has made input to reject the suggestion. The suggestion response recognition unit 16A determines whether the driver has made input to reject the suggestion based on information that the driver inputs to the steer switch 5.

When the suggestion response recognition unit 16A determines that the driver has made input to reject the suggestion (YES in S22), the suggestion response recognition unit 16A of the ECU 10A recognizes that the driver rejects the suggestion in S23. Subsequently, the first prohibition duration setting unit 17A of the ECU 10A extends the first prohibition duration in S24. The first prohibition duration setting unit 17A extends the first prohibition duration by, for example, adding the predetermined adding duration to the first prohibition duration. After that, the ECU 10A ends the process of FIG. 3.

On the other hand, when the suggestion response recognition unit 16A determines that the driver has not made input for rejection (NO in S22), the suggestion response recognition unit 16A of the ECU 10A determines in S25 whether the driver has made input for acceptance. The suggestion response recognition unit 16A determines whether the driver has made input for acceptance based on information that the driver inputs to the steer switch 5.

When the suggestion response recognition unit 16A determines that the driver has made input for acceptance (YES in S25), the suggestion response recognition unit 16A of the ECU 10A recognizes that the driver accepts the suggestion in S26. Subsequently, the first prohibition duration setting unit 17A of the ECU 10A shortens or keeps the first prohibition duration in S27. The first prohibition duration setting unit 17A shortens the first prohibition duration by, for example, subtracting the predetermined subtracting duration from the first prohibition duration. When the first prohibition duration setting unit 17A shortens the first prohibition duration, the first prohibition duration setting unit 17A may set the first prohibition duration such that the first prohibition duration is not shorter than the initial value. The first prohibition duration setting unit 17A may keep the first prohibition duration. After that, the ECU 10A ends the process of FIG. 3.

On the other hand, when the first prohibition duration setting unit 17A determines that the overtaking suggestion unit 15A has not suggested autonomous overtaking to the driver (NO in S21), the suggestion response recognition unit 16A of the ECU 10A determines in S28 whether the suggestion response recognition unit 16A recognizes that the driver has made voluntary input. When the suggestion response recognition unit 16A determines that the suggestion response recognition unit 16A does not recognize that the driver has made voluntary input (NO in S28), the ECU 10A ends the process of FIG. 3.

When the suggestion response recognition unit 16A determines that the suggestion response recognition unit 16A recognizes that the driver has made voluntary input (YES in S28), the first prohibition duration setting unit 17A of the ECU 10A shortens the first prohibition duration in S29. The first prohibition duration setting unit 17A shortens the first prohibition duration by, for example, subtracting the predetermined subtracting duration from the first prohibition duration. When the first prohibition duration setting unit 17A shortens the first prohibition duration, the first prohibition duration setting unit 17A may set the first prohibition duration such that the first prohibition duration is not shorter than the initial value. When the first prohibition duration has not been extended once, the first prohibition duration setting unit 17A need not shorten the first prohibition duration. After that, the ECU 10A ends the process of FIG. 3.

Operation and Advantageous Effects of Autonomous Driving System 100A

With the autonomous driving system 100A, when the overtaking suggestion unit 15A suggests autonomous overtaking to the driver and the suggestion response recognition unit 16A recognizes that the driver rejects the suggestion, the first prohibition duration setting unit 17A extends the first prohibition duration as compared to when the overtaking suggestion unit 15A suggests autonomous overtaking to the driver and the suggestion response recognition unit 16A recognizes that the driver accepts the suggestion Thus, when there is a driver's intention to reject the suggestion for autonomous overtaking, another suggestion for autonomous overtaking becomes hard to be made. Therefore, it is possible to suggest control that accompanies a lane change of the host vehicle during autonomous driving to reduce a burden on the driver.

In the autonomous driving system 100A, when the suggestion response recognition unit 16A recognizes that the driver has made voluntary input before elapsed time from the last suggestion time at which the overtaking suggestion unit 15A has suggested autonomous overtaking last time becomes longer than or equal to the first prohibition duration, the vehicle control unit 18A causes the host vehicle to autonomously overtake a preceding vehicle. Thus, when the overtaking suggestion unit 15A is not allowed to make another suggestion for autonomous overtaking after a suggestion for autonomous overtaking and there is a driver's intention to make a request of the host vehicle to autonomously overtake the preceding vehicle, it is possible to cause the host vehicle to autonomously overtake the preceding vehicle in accordance with the intention.

Second Embodiment

Figure 4:
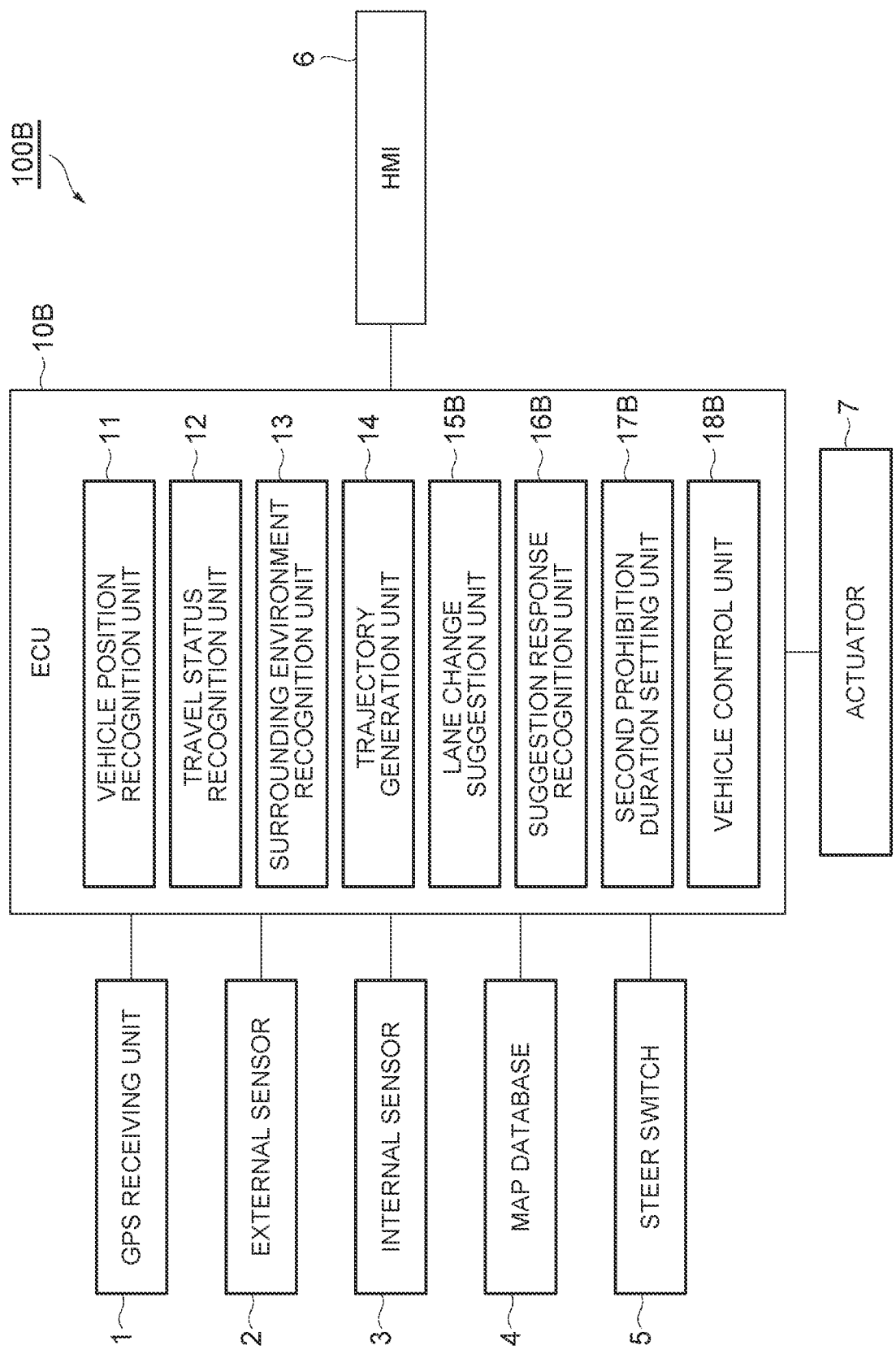
FIG. 4 is a block diagram that shows the configuration of an autonomous driving system according to a second embodiment.

An autonomous driving system according to a second embodiment will be described. FIG. 4 is a block diagram that shows the configuration of the autonomous driving system according to the second embodiment. The autonomous driving system 100B shown in FIG. 4 differs from the autonomous driving system 100A in that a discretionary lane change is made as one of autonomous driving control over the host vehicle.

A discretionary lane change is a lane change that the host vehicle makes during autonomous driving, and is a lane change for which the driver has a choice to accept or reject. A lane change for which the driver has a choice to approve or not approve means a lane change that is not indispensable in autonomous driving.

Examples of a lane change that is not indispensable in autonomous driving include a lane change for avoiding another vehicle that merges into the driving lane. Avoiding another vehicle that merges into the driving lane means a lane change that, when the host vehicle approaches a merged section that is a section in which another lane (merging lane) merges into the driving lane of the host vehicle, the host vehicle makes a lane change for avoiding an approach to another vehicle (merging vehicle) that travels in the merging lane according to the relative relationship between the host vehicle and the merging vehicle. Examples of a lane change that is indispensable in autonomous driving may include a lane change for reaching a destination of autonomous driving (for example, a lane change for turning right or left at an intersection) and a lane change for avoiding a traffic control section (for example, a lane change for traveling along a trajectory changed based on road control information).

The autonomous driving system 100B suggests a discretionary lane change to the driver as information on autonomous driving, and causes the host vehicle to make a lane change when the autonomous driving system 100B recognizes that the driver accepts the suggestion for the discretionary lane change. Thus, the host vehicle makes a lane change from a driving lane to an adjacent lane.

Configuration of Autonomous Driving System 100B

As shown in FIG. 4, the autonomous driving system 100B according to the present embodiment basically has a similar configuration to the autonomous driving system 100A of the first embodiment except for some components.

The steer switch 5 receives driver's input to reject a suggestion for a discretionary lane change. Input to reject a suggestion is driver's input through which the driver conveys the intention to reject a suggestion for a discretionary lane change to the autonomous driving system 100B. The steer switch 5 transmits information about the detected input to reject a suggestion for a discretionary lane change to the ECU 10B.

The steer switch 5 receives driver's voluntary input for a discretionary lane change. Voluntary input is driver's voluntary input (driver trigger) through which the driver conveys the intention to make a request of the host vehicle to make a discretionary lane change to the autonomous driving system 100B when a lane change suggestion unit 15B (described later) has not suggested a discretionary lane change. The steer switch 5 transmits information about the detected voluntary input to the ECU 10B.

Next, the functional configuration of the ECU 10B will be described. Hereinafter, to explain control that the ECU 10B executes, the functions of the ECU 10B will be described for the sake of convenience. The ECU 10B includes the lane change suggestion unit 15B, a suggestion response recognition unit 16B, a second prohibition duration setting unit 17B, and a vehicle control unit (lane change execution unit) 18B as functional components different from those of the ECU 10A. The trajectory generation unit 14 generates a trajectory that is used in discretionary lane change when the lane change suggestion unit 15B (described later) suggests a discretionary lane change or when the suggestion response recognition unit 16B (described later) recognizes that the driver has made voluntary input for a discretionary lane change.

The lane change suggestion unit 15B suggests a discretionary lane change to the driver based on the map information of the map database 4, the position of the host vehicle on the map, and the surrounding environment of the host vehicle. Specifically, the lane change suggestion unit 15B recognizes information on a merged section in the driving lane of the host vehicle and the relative situation of a merging vehicle to the host vehicle based on the information detected by the external sensor 2 (information about an obstacle detected by the radar sensor or information about an image captured by the camera) and the map information of the map database 4. The relative situation of a merging vehicle to the host vehicle contains the relative distance between the host vehicle and the merging vehicle and the relative vehicle speed of the merging vehicle to the host vehicle. The lane change suggestion unit 15B determines whether the host vehicle is close to a merged section by, for example, determining whether the distance from the host vehicle to the start point of the merged section is shorter than a distance threshold set in advance based on the map information and the position of the host vehicle on the map.

The lane change suggestion unit 15B recognizes that the host vehicle can make a lane change from a driving lane to an adjacent lane, for example, when there is an adjacent lane adjacent to the driving lane. The lane change suggestion unit 15B may further consult traffic regulation information or traffic control information, and may recognize that the host vehicle can make a lane change from a driving lane to an adjacent lane only when the host vehicle is traveling in a section where a lane change is permitted by traffic regulations or traffic control. The traffic regulation information and the traffic control information may be acquired from the map information or may be acquired by recognizing a traffic sign on a roadside based on information about an image captured by the camera.

The lane change suggestion unit 15B may recognize that the host vehicle can make a lane change from a driving lane to an adjacent lane when there is no other vehicle that interferes with the lane change in the adjacent lane. Another vehicle that interferes with a lane change may be, for example, another vehicle that travels in the adjacent lane and whose time to collision with the host vehicle in a direction in which the driving lane extends (in a direction in which the adjacent lane extends) is shorter than or equal to a threshold set in advance. Another vehicle that interferes with a lane change may be recognized with other known techniques in the technical field of lane change control.

The lane change suggestion unit 15B suggests a discretionary lane change to the driver based on the information on a merged section in a driving lane of the host vehicle, the relative situation of a merging vehicle to the host vehicle, and the surrounding environment of the host vehicle. The lane change suggestion unit 15B suggests a discretionary lane change to the driver, for example, when the time to collision between the host vehicle and a merging vehicle is shorter than a lane change suggestion threshold set in advance.

The lane change suggestion unit 15B does not suggest a discretionary lane change to the driver before a second prohibition duration that is set by the second prohibition duration setting unit 17B (described later) elapses from the last suggestion for a discretionary lane change. The second prohibition duration is a duration (interval) during which the lane change suggestion unit 15B is not allowed to make another suggestion for a discretionary lane change after a suggestion for a discretionary lane change.

As an example, the lane change suggestion unit 15B determines whether the current suggestion for a discretionary lane change is the first suggestion. The first suggestion means a suggestion for a discretionary lane change, which is made for the first time after predetermined initialization timing (for example, on power-up of the ECU 10B). When the lane change suggestion unit 15B determines that the current suggestion for a discretionary lane change is the first suggestion, the lane change suggestion unit 15B may suggest a discretionary lane change to the driver irrespective of the second prohibition duration.

When the lane change suggestion unit 15B determines that the current suggestion for a discretionary lane change is not the first suggestion, the lane change suggestion unit 15B determines whether the second prohibition duration has elapsed from the last suggestion for a discretionary lane change. The lane change suggestion unit 15B, for example, stores a time at which the lane change suggestion unit 15B has made a last suggestion for a discretionary lane change as a last suggestion time, and determines whether the second prohibition duration has elapsed from the last suggestion for a discretionary lane change based on whether elapsed time from the stored last suggestion time is longer than or equal to the second prohibition duration at the time of a subsequent suggestion for a discretionary lane change. When the lane change suggestion unit 15B determines that the elapsed time from the stored last suggestion time is longer than or equal to the second prohibition duration, the lane change suggestion unit 15B may suggest a discretionary lane change to the driver. When the lane change suggestion unit 15B determines that the elapsed time from the stored last suggestion time is not longer than or equal to the second prohibition duration, the lane change suggestion unit 15B does not suggest a discretionary lane change to the driver.

The lane change suggestion unit 15B suggests a discretionary lane change to the driver by transmitting a control signal to the HMI 6. The lane change suggestion unit 15B, for example, suggests to the driver via voice output from the speaker that the host vehicle make a lane change. Voice output also includes buzzer only. The lane change suggestion unit 15B may show an image for suggesting a discretionary lane change on the display in addition to the speaker. The lane change suggestion unit 15B may suggest a discretionary lane change by only showing an image on the display. The lane change suggestion unit 15B may further call driver's attention by vibrating the steering wheel or vibrating the driver seat.

When the lane change suggestion unit 15B has suggested a discretionary lane change, the suggestion response recognition unit 16B recognizes whether the driver accepts the suggestion for a discretionary lane change, made by the lane change suggestion unit 15B, based on information input by the driver to the steer switch 5 of the host vehicle. Information input by the driver contains not only the fact that the driver has made input to the steer switch 5 of the host vehicle but also the fact that the driver has not made input.

The suggestion response recognition unit 16B determines whether deemed acceptance requirements are satisfied based on, for example, elapsed time from when a suggestion for a discretionary lane change is made to the driver. Deemed acceptance requirements are requirements to recognize that the driver's acceptance instead of driver's input for acceptance to the steer switch 5. The deemed acceptance requirements can be satisfied, for example, when the lane change suggestion unit 15B has suggested a discretionary lane change to the driver and there is no driver's input for rejection within a set duration after the suggestion for a discretionary lane change. The set duration may be, for example, a duration until a discretionary lane change is started by transmitting a control signal to the actuator 7. When the suggestion response recognition unit 16B determines that the deemed acceptance requirements are satisfied, the suggestion response recognition unit 16B recognizes driver's acceptance on the assumption of driver's acceptance.

When the lane change suggestion unit 15B suggests a discretionary lane change, the suggestion response recognition unit 16B determines whether the driver has made input for rejection based on the information input to the steer switch 5. For example, when the lane change suggestion unit 15B has suggested a discretionary lane change to the driver and the suggestion response recognition unit 16B determines that the driver has made input for rejection to the steer switch 5 within the set duration from the suggestion for a discretionary lane change, the suggestion response recognition unit 16B recognizes that the driver rejects the suggestion.

When the lane change suggestion unit 15B has not suggested a discretionary lane change, the suggestion response recognition unit 16B determines whether the driver has made voluntary input based on information input by the driver to the steer switch 5 of the host vehicle. For example, when the lane change suggestion unit 15B has not suggested a discretionary lane change and the suggestion response recognition unit 16B determines that the driver has made voluntary input for a discretionary lane change to the steer switch 5, the suggestion response recognition unit 16B recognizes that the driver has made voluntary input.

The second prohibition duration setting unit 17B sets the second prohibition duration based on information that the suggestion response recognition unit 16B recognizes. The second prohibition duration setting unit 17B sets a predetermined duration set in advance as an initial value of the second prohibition duration, for example, at the predetermined initialization timing (for example, on power-up of the ECU 10B).

When the lane change suggestion unit 15B has suggested a discretionary lane change to the driver and the suggestion response recognition unit 16B recognizes that the driver rejects the suggestion, the second prohibition duration setting unit 17B extends the second prohibition duration as compared to when the lane change suggestion unit 15B has suggested a discretionary lane change to the driver and the suggestion response recognition unit 16B recognizes that the driver accepts the suggestion. More specifically, when the lane change suggestion unit 15B has suggested a discretionary lane change to the driver and the suggestion response recognition unit 16B recognizes that the driver rejects the suggestion, the second prohibition duration setting unit 17B extends the second prohibition duration (sets the second prohibition duration to a longer duration). On the other hand, when the lane change suggestion unit 15B has suggested a discretionary lane change to the driver and the suggestion response recognition unit 16B recognizes that the driver accepts the suggestion, the second prohibition duration setting unit 17B does not extend the second prohibition duration. Not extending the second prohibition duration includes keeping the second prohibition duration and shortening the second prohibition duration (setting the second prohibition duration to a shorter duration).

Specifically, when the lane change suggestion unit 15B has suggested a discretionary lane change to the drive and the suggestion response recognition unit 16B recognizes that the driver rejects the suggestion, the second prohibition duration setting unit 17B extends the second prohibition duration by, for example, adding a predetermined adding duration to the second prohibition duration before the suggestion response recognition unit 16B recognizes that the driver rejects the suggestion. The predetermined adding duration means the amount of increase in the second prohibition duration for reducing the frequency of suggestion for a discretionary lane change based on driver's intention to reject the suggestion. The predetermined adding duration may be a fixed value or may be a variable value. The predetermined adding duration may be equal to the adding duration of the first embodiment or may be different from the adding duration of the first embodiment.

When the lane change suggestion unit 15B has suggested a discretionary lane change to the driver and the suggestion response recognition unit 16B recognizes driver's acceptance, the second prohibition duration setting unit 17B may, for example, keep the second prohibition duration as that before the suggestion response recognition unit 16B recognizes approval. The second prohibition duration when kept in this way is shorter than the second prohibition duration when disapproval is recognized by the suggestion response recognition unit 16B. Alternatively, when the lane change suggestion unit 15B has suggested a discretionary lane change and the suggestion response recognition unit 16B recognizes driver's acceptance, the second prohibition duration setting unit 17B may shorten the second prohibition duration by, for example, subtracting a predetermined subtracting duration from the second prohibition duration before the suggestion response recognition unit 16B recognizes driver's acceptance. The predetermined subtracting duration means the amount of reduction in the second prohibition duration for increasing the frequency of suggestion for a discretionary lane change based on driver's intention of approval. The predetermined subtracting duration may be a fixed value or may be a variable value. The predetermined subtracting duration may be equal to the subtracting duration of the first embodiment or may be different from the subtracting duration of the first embodiment. When the second prohibition duration setting unit 17B shortens the second prohibition duration, the second prohibition duration setting unit 17B may set the second prohibition duration such that the second prohibition duration is not shorter than the initial value.

When the lane change suggestion unit 15B has suggested a discretionary lane change and the suggestion response recognition unit 16B recognizes multiple consecutive times that the driver rejects the suggestion, the second prohibition duration setting unit 17B may set the second prohibition duration to a duration that is extended according to the number of times the suggestion response recognition unit 16B consecutively recognizes that the driver rejects the suggestion based on driver's intention to consecutively reject the suggestion.

The second prohibition duration setting unit 17B may return the second prohibition duration to the initial value when the suggestion response recognition unit 16B recognizes voluntary input after the suggestion response recognition unit 16B recognizes that the driver rejects the suggestion. Alternatively, the second prohibition duration setting unit 17B may set the second prohibition duration such that the second prohibition duration becomes the second prohibition duration just before the suggestion response recognition unit 16B recognizes that the driver rejects the suggestion.

The vehicle control unit 18B causes the host vehicle to autonomously make a discretionary lane change based on information that the suggestion response recognition unit 16B recognizes. When the suggestion response recognition unit 16B recognizes that the driver accepts a suggestion for a discretionary lane change suggested to the driver by the lane change suggestion unit 15B, the vehicle control unit 18B causes the host vehicle to make a discretionary lane change. The vehicle control unit 18B causes the host vehicle to make a discretionary lane change by transmitting a control signal to the actuator 7. The vehicle control unit 18B is able to execute a discretionary lane change through known vehicle control.

When the suggestion response recognition unit 16B recognizes that the driver has made voluntary input before elapsed time from the time at which when the lane change suggestion unit 15B has suggested a discretionary lane change last time becomes longer than or equal to the second prohibition duration, the vehicle control unit 18B may execute discretionary lane change over the host vehicle. For example, when the lane change suggestion unit 15B determines that elapsed time from the last suggestion time stored in the lane change suggestion unit 15B is not longer than or equal to the second prohibition duration and the suggestion response recognition unit 16B recognizes that the driver has made voluntary input, the vehicle control unit 18B causes the host vehicle to make a discretionary lane change.

When the suggestion response recognition unit 16B recognizes that the driver rejects a suggestion for a discretionary lane change suggested to the driver by the lane change suggestion unit 15B, the vehicle control unit 18B does not cause the host vehicle to make a discretionary lane change. When the lane change suggestion unit 15B determines that elapsed time from the last suggestion time stored in the lane change suggestion unit 15B is not longer than or equal to the second prohibition duration and the suggestion response recognition unit 16B does not recognize that the driver has made voluntary input, the vehicle control unit 18B does not cause the host vehicle to make a discretionary lane change.

Example of Computation Process by ECU 10B

Figure 5:
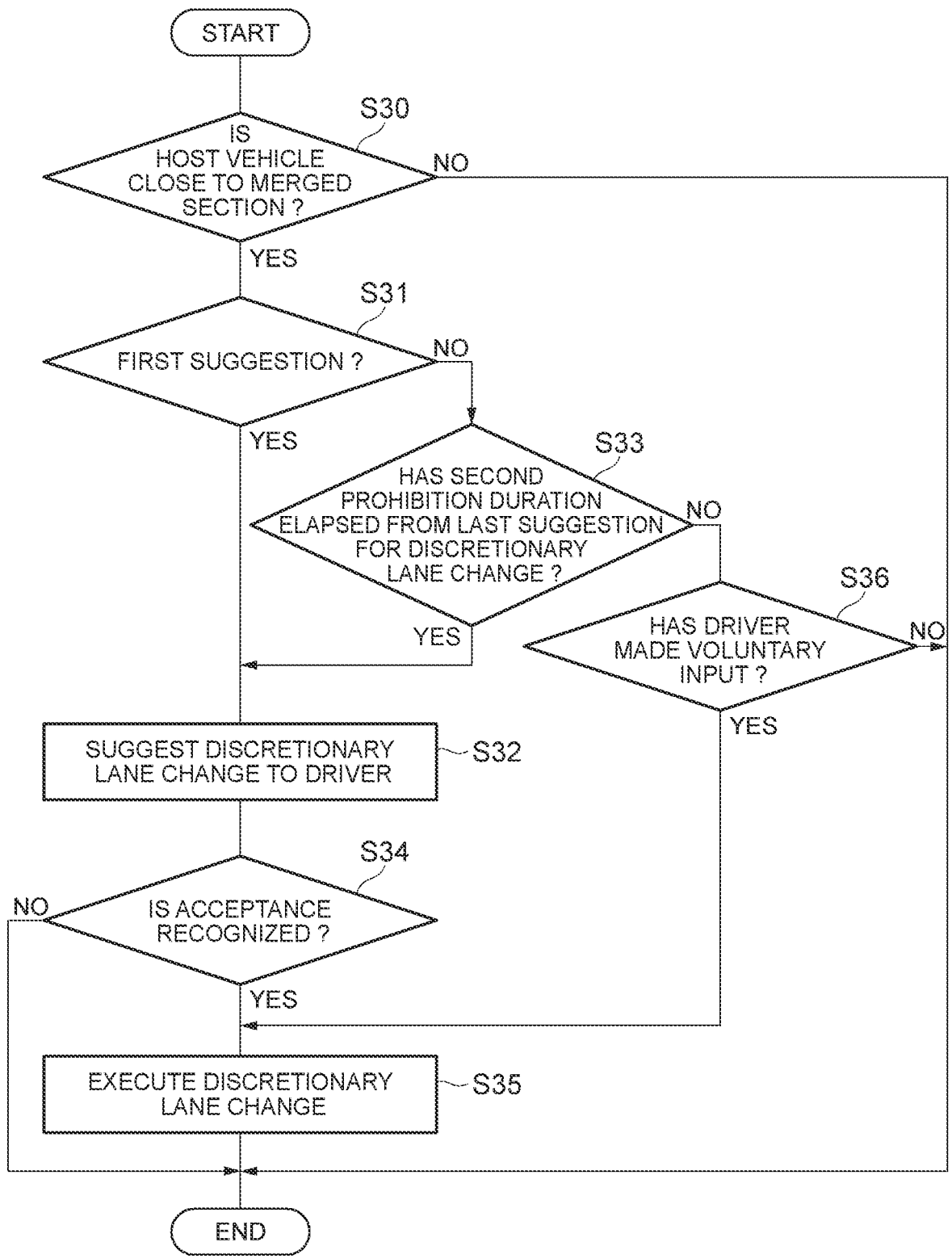
FIG. 5 is a flowchart that illustrates a discretionary lane change process.

Next, an example of a computation process by the ECU 10B will be described. FIG. 5 is a flowchart that illustrates a discretionary lane change process. The process shown in FIG. 5 is executed, for example, in a situation in which the host vehicle can make a lane change from a driving lane to an adjacent lane during autonomous driving of the host vehicle.

As shown in FIG. 5, the lane change suggestion unit 15B of the ECU 10B determines in S20 whether the host vehicle is close to a merged section. The lane change suggestion unit 15B determines whether the host vehicle is close to a merged section by, for example, determining whether the distance from the host vehicle to the start point of the merged section is shorter than the distance threshold set in advance based on the map information of the map database 4 and information that the vehicle position recognition unit 11 recognizes.

When the lane change suggestion unit 15B determines in S30 that the host vehicle is close to the merged section, the lane change suggestion unit 15B of the ECU 10B determines in S31 whether the current suggestion for a discretionary lane change is the first suggestion.

When the lane change suggestion unit 15B determines that the current suggestion for a discretionary lane change is the first suggestion (YES in S31), the lane change suggestion unit 15B of the ECU 10B suggests a discretionary lane change to the driver in S32. The lane change suggestion unit 15B suggests a discretionary lane change to the driver by, for example, transmitting a control signal to the HMI 6.

When the lane change suggestion unit 15B determines that the current suggestion for a discretionary lane change is not the first suggestion (NO in S31), the lane change suggestion unit 15B of the ECU 10B determines in S33 whether the second prohibition duration has elapsed from the last suggestion for a discretionary lane change. The lane change suggestion unit 15B determines whether the second prohibition duration has elapsed from the last suggestion for a discretionary lane change based on, for example, whether elapsed time from the last suggestion time stored at the time of the last suggestion for a discretionary lane change is longer than or equal to the second prohibition duration.

When the lane change suggestion unit 15B determines that the second prohibition duration has elapsed from the last suggestion for a discretionary lane change (YES in S33), the ECU 10B proceeds to S32, and the lane change suggestion unit 15B of the ECU 10B suggests a discretionary lane change to the driver.

The suggestion response recognition unit 16B of the ECU 10B determines in S34 whether the suggestion response recognition unit 16B recognizes driver's acceptance. Driver's acceptance means that the deemed acceptance requirements are satisfied. The suggestion response recognition unit 16B determines whether the suggestion response recognition unit 16B recognizes that the driver accepts the suggestion for a discretionary lane change based on, for example, information input through the steer switch 5. When the suggestion response recognition unit 16B determines that the suggestion response recognition unit 16B recognizes driver's acceptance (YES in S34), the vehicle control unit 18B of the ECU 10B executes a discretionary lane change in S35. The vehicle control unit 18B causes the host vehicle to make a discretionary lane change by, for example, transmitting a control signal to the actuator 7.

When the suggestion response recognition unit 16B determines that the suggestion response recognition unit 16B does not recognize driver's acceptance (NO in S34), the vehicle control unit 18B of the ECU 10B does not execute a discretionary lane change. When the suggestion response recognition unit 16B recognizes that the driver rejects the suggestion for a discretionary lane change suggested to the driver by the lane change suggestion unit 15B, the vehicle control unit 18B does not cause the host vehicle to make a discretionary lane change. After that, the process of FIG. 5 is ended.

On the other hand, when the lane change suggestion unit 15B determines that the second prohibition duration has not elapsed from the last suggestion for a discretionary lane change (NO in S33), the lane change suggestion unit 15B does not suggest a discretionary lane change to the driver, and the vehicle control unit 18B determines in S36 whether the suggestion response recognition unit 16B recognizes that the driver has made voluntary input.

When the vehicle control unit 18B determines that the suggestion response recognition unit 16B recognizes that the driver has made voluntary input (YES in S36), the ECU 10B proceeds to S35, and the vehicle control unit 18B executes a discretionary lane change. When the vehicle control unit 18B determines that the suggestion response recognition unit 16B does not recognize that the driver has made voluntary input (NO in S36), the ECU 10B does not execute a discretionary lane change and ends the process of FIG. 5.

Figure 6:
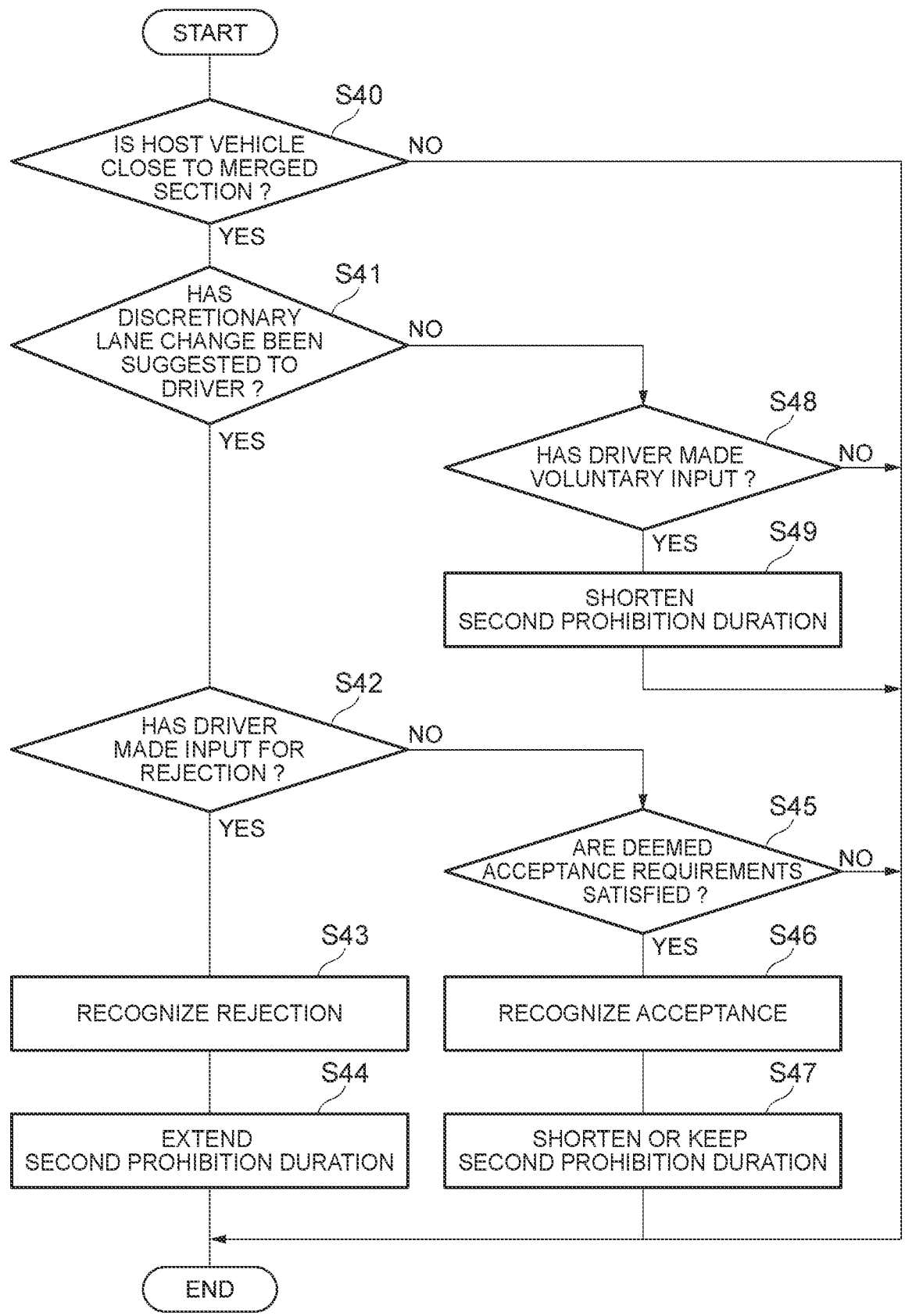
FIG. 6 is a flowchart that illustrates a second prohibition duration setting process.

Subsequently, FIG. 6 is a flowchart that illustrates a second prohibition duration setting process. The process shown in FIG. 6 is, for example, executed in a situation in which the host vehicle can make a lane change from a driving lane to an adjacent lane during autonomous driving of the host vehicle.

As shown in FIG. 6, the lane change suggestion unit 15B of the ECU 10B determines in S40 whether the host vehicle is close to a merged section. The lane change suggestion unit 15B, for example, determines whether the host vehicle is close to the merged section as in the case of S30. When the lane change suggestion unit 15B determines that the host vehicle is not close to the merged section (NO in S40), the ECU 10B ends the process of FIG. 6.

When the lane change suggestion unit 15B determines that the host vehicle is close to the merged section (YES in S40), the second prohibition duration setting unit 17B of the ECU 10B determines in S41 whether the lane change suggestion unit 15B has suggested a discretionary lane change to the driver. For example, when the lane change suggestion unit 15B has transmitted a control signal to the HMI 6 in S32, the second prohibition duration setting unit 17B may determine that the lane change suggestion unit 15B has suggested a discretionary lane change to the driver.

When the second prohibition duration setting unit 17B determines that the lane change suggestion unit 15B has suggested a discretionary lane change to the driver (YES in S41), the suggestion response recognition unit 16B of the ECU 10B determines in S42 whether the driver has made input for rejection. The suggestion response recognition unit 16B determines whether the driver has made input for rejection based on information that the driver inputs to the steer switch 5.

When the suggestion response recognition unit 16B determines that the driver has made input for rejection (YES in S42), the suggestion response recognition unit 16B of the ECU 10B recognizes driver's rejection in S43. Subsequently, the second prohibition duration setting unit 17B of the ECU 10B extends the second prohibition duration in S44. The second prohibition duration setting unit 17B extends the second prohibition duration by, for example, adding the predetermined adding duration to the second prohibition duration. After that, the ECU 10B ends the process of FIG. 6.

On the other hand, when the suggestion response recognition unit 16B determines that the driver has not made input for rejection (NO in S42), the suggestion response recognition unit 16B of the ECU 10B determines in S45 whether the deemed acceptance requirements are satisfied. The suggestion response recognition unit 16B determines whether the deemed acceptance requirements are satisfied based on, for example, whether elapsed time from when the suggestion for a discretionary lane change is made to the driver is longer than or equal to the set duration.

When the suggestion response recognition unit 16B determines that the deemed acceptance requirements are satisfied (YES in S45), the suggestion response recognition unit 16B of the ECU 10B recognizes driver's acceptance on the assumption of driver's acceptance in S46. Subsequently, the second prohibition duration setting unit 17B of the ECU 10B shortens or keeps the second prohibition duration in S47. The second prohibition duration setting unit 17B shortens the second prohibition duration by, for example, subtracting the predetermined subtracting duration from the second prohibition duration. When the second prohibition duration setting unit 17B shortens the second prohibition duration, the second prohibition duration setting unit 17B may set the second prohibition duration such that the second prohibition duration is not shorter than the initial value. The second prohibition duration setting unit 17B may keep the second prohibition duration. When the second prohibition duration has not been extended once, the second prohibition duration setting unit 17B need not shorten the second prohibition duration. After that, the ECU 10B ends the process of FIG. 6.

On the other hand, when the second prohibition duration setting unit 17B determines that the lane change suggestion unit 15B has not suggested a discretionary lane change to the driver (NO in S41), the suggestion response recognition unit 16B of the ECU 10B determines in S48 whether the suggestion response recognition unit 16B recognizes that the driver has made voluntary input. When the suggestion response recognition unit 16B determines that the suggestion response recognition unit 16B does not recognize that the driver has made voluntary input (NO in S48), the ECU 10B ends the process of FIG. 6.

When the suggestion response recognition unit 16B determines that the suggestion response recognition unit 16B recognizes that the driver has made voluntary input (YES in S48), the second prohibition duration setting unit 17B of the ECU 10B shortens the second prohibition duration in S49. The second prohibition duration setting unit 17B shortens the second prohibition duration by, for example, subtracting the predetermined subtracting duration from the second prohibition duration. When the second prohibition duration setting unit 17B shortens the second prohibition duration, the second prohibition duration setting unit 17B may set the second prohibition duration such that the second prohibition duration is not shorter than the initial value. After that, the ECU 10B ends the process of FIG. 6.

Operation and Advantageous Effects of Autonomous Driving System 100B

With the autonomous driving system 100B, when the lane change suggestion unit 15B has suggested a discretionary lane change to the driver and the suggestion response recognition unit 16B recognizes driver's rejection, the second prohibition duration setting unit 17B extends the second prohibition duration as compared to when the lane change suggestion unit 15B has suggested a discretionary lane change to the driver and the suggestion response recognition unit 16B recognizes driver's acceptance. Thus, when there is a driver's intention to reject the suggestion for a discretionary lane change, another suggestion for a discretionary lane change becomes hard to be made. Therefore, it is possible to suggest control that accompanies a lane change of the host vehicle during autonomous driving to reduce a burden on the driver.

In the autonomous driving system 100B, when the suggestion response recognition unit 16B recognizes that the driver has made voluntary input before elapsed time from when the lane change suggestion unit 15B has suggested a discretionary lane change last time becomes longer than or equal to the second prohibition duration, the vehicle control unit 18B causes the host vehicle to make a discretionary lane change. Thus, when the lane change suggestion unit 15B is not allowed to make another suggestion for a discretionary lane change after a suggestion for a discretionary lane change and there is a driver's intention to make a request of the host vehicle to make a discretionary lane change, it is possible to cause the host vehicle to make a discretionary lane change in accordance with the intention.

Modifications

The embodiments of the disclosure are described above; however, the disclosure is not limited to the above-described embodiments. The disclosure may be implemented in not only the above-described embodiments but also various modes with various changes or improvements based on the knowledge of persons skilled in the art.

In the first and second embodiments, the steer switch 5 is illustrated as the input unit; however, the input unit is not limited to the steer switch 5. The input unit may be, for example, a touch panel of the HMI 6. The input unit may be a button or lever other than the steer switch 5 or may be a voice input device.

In the first embodiment, the overtaking suggestion unit 15A suggests autonomous overtaking to the driver when the time to collision between the host vehicle and a preceding vehicle is shorter than the autonomous overtaking suggestion threshold set in advance. The overtaking suggestion unit 15A may further consider a set vehicle speed difference between a set vehicle speed of autonomous driving of the host vehicle and a vehicle speed of a preceding vehicle. For example, the overtaking suggestion unit 15A need not suggest autonomous overtaking when the set vehicle speed difference is shorter than or equal to a first threshold. When the set vehicle speed difference is greater than the first threshold and less than or equal to a second threshold greater than the first threshold, the overtaking suggestion unit 15A may suggest autonomous overtaking such that the host vehicle overtakes only the preceding vehicle. When the set vehicle speed difference is greater than the second threshold and less than or equal to a third threshold greater than the second threshold, the overtaking suggestion unit 15A may suggest autonomous overtaking such that the host vehicle overtakes a plurality of vehicles including the preceding vehicle. The first to third thresholds may be, for example, thresholds of set vehicle speed difference, set in advance. Instead of time to collision, time headway (THW) may be used.

In the first embodiment, the suggestion response recognition unit 16A determines whether the driver has made voluntary input to the steer switch 5 of the host vehicle based on information that the driver inputs to the steer switch 5 of the host vehicle when the overtaking suggestion unit 15A has not suggested autonomous overtaking. Instead, the suggestion response recognition unit 16A may determine whether the driver has made voluntary input based on driver's intervening operation. For example, when the overtaking suggestion unit 15A has not suggested autonomous overtaking and the driver makes intervening operation with a steering wheel with an intention to make a lane change, the suggestion response recognition unit 16A may determine that the driver has made voluntary input.

In the second embodiment, the suggestion response recognition unit 16B determines whether the driver has made voluntary input to the steer switch 5 of the host vehicle based on information that the driver inputs to the steer switch 5 of the host vehicle when the lane change suggestion unit 15B has not suggested a discretionary lane change. Instead, the suggestion response recognition unit 16B may determine whether the driver has made voluntary input based on driver's intervening operation. For example, when the lane change suggestion unit 15B has not suggested a discretionary lane change and the driver makes intervening operation with a steering wheel with an intention to make a discretionary lane change, the suggestion response recognition unit 16B may determine that the driver has made voluntary input.

In the second embodiment, the suggestion response recognition unit 16B recognizes driver's acceptance by determining whether the deemed acceptance requirements are satisfied based on elapsed time from when a suggestion for a discretionary lane change is made to the driver. Instead, as in the case of the first embodiment, the suggestion response recognition unit 16B may recognize that the driver has made input for acceptance based on whether the driver has made input for acceptance to the steer switch 5.

The overtaking suggestion unit 15A does not always need to determine whether a suggestion for autonomous overtaking is the first suggestion. The overtaking suggestion unit 15A may determine only whether elapsed time from a suggestion for autonomous overtaking is longer than or equal to the first prohibition duration. This also applies to the lane change suggestion unit 15B.

The first embodiment and the second embodiment may be combined with each other. The autonomous driving system may be configured to be able to execute both autonomous overtaking and discretionary lane change.

In the autonomous driving system according to the first aspect of the disclosure, the electronic control unit may be configured to, when the electronic control unit recognizes that the driver has made voluntary input before elapsed time from time at which overtaking is suggested last time becomes longer than or equal to the first prohibition duration, cause the host vehicle to overtake the preceding vehicle. In this case, when the electronic control unit is not allowed to make another suggestion for overtaking after a suggestion for overtaking and there is a driver's intention to make a request of the host vehicle to overtake the preceding vehicle, the electronic control unit is able to cause the host vehicle to overtake the preceding vehicle in accordance with the intention.

In the autonomous driving system according to the second aspect of the disclosure, the electronic control unit may be configured to, when the electronic control unit recognizes that the driver has made voluntary input before elapsed time from time at which the discretionary lane change is suggested last time becomes longer than or equal to the second prohibition duration, cause the host vehicle to make the discretionary lane change. In this case, when the electronic control unit is not allowed to make another suggestion for a discretionary lane change after a suggestion for a discretionary lane change and there is a driver's intention to make a request of the host vehicle to make a discretionary lane change, it is possible to cause the host vehicle to make a discretionary lane change in accordance with the intention.

What is claimed is:

1. A control method for an autonomous driving system, the autonomous driving system including an electronic control unit, the control method comprising:
   presenting a first suggestion, by the electronic control unit, to a driver that a host vehicle make a discretionary lane change during autonomous driving based on map information, a position of the host vehicle on a map, and a surrounding environment of the host vehicle;
   recognizing, by the electronic control unit, whether the driver accepts the first suggestion for the discretionary lane change based on information input by the driver to an input unit of the host vehicle;
   in response to the electronic control unit presenting the first suggestion to the driver that the host vehicle make the discretionary lane change and recognizing that the driver accepts the first suggestion, causing, by the electronic control unit, the host vehicle to make the discretionary lane change;
   in response to the electronic control unit presenting the first suggestion to the driver that the host vehicle make the discretionary lane change and recognizing that the driver rejects the first suggestion, not causing, by the electronic control unit, the host vehicle to make the discretionary lane change;
   setting, by the electronic control unit, a first prohibition duration based on whether the driver accepts the first suggestion, recognized by the electronic control unit, the first prohibition duration being a duration during which another suggestion for the discretionary lane change is not allowed after the first suggestion for the discretionary lane change; and in response to the electronic control unit presenting the first suggestion to the driver that the host vehicle make the discretionary lane change and recognizing that the driver rejects the first suggestion, extending, by the electronic control unit, the first prohibition duration by adding a variable adding duration to the first prohibition duration as compared to when the electronic control unit presenting the first suggestion to the driver that the host vehicle make the discretionary lane change and recognizes that the driver accepts the first suggestion, wherein a second suggestion for a discretionary lane change before an expiration of the extended first prohibition duration is not allowed, and a third suggestion after the extended first prohibition duration is allowed and presented to the driver, in response to an input that the driver has made before the expiration of the extended first prohibition duration, shortening the extended first prohibition duration by subtracting a variable subtracting duration from the extended first prohibition duration; and after the first prohibition duration is extended, in response to the electronic control unit presenting the third suggestion to the driver that the host vehicle make the discretionary lane change and recognizing that the driver accepts the third suggestion, shortening the extended first prohibition duration by subtracting the variable subtracting duration from the extended first prohibition duration.

2. The control method according to claim 1, wherein the shortened first prohibition duration is the same as or longer than the initially set first prohibition duration.

3. The control method according to claim 1, wherein the input is received from a steer switch of the vehicle.

* * * * *